US008089968B2

(12) United States Patent
Filsfils et al.

(10) Patent No.: US 8,089,968 B2
(45) Date of Patent: *Jan. 3, 2012

(54) AUTOMATIC PRIORITIZATION OF BGP NEXT-HOP IN IGP CONVERGENCE

(75) Inventors: Clarence Filsfils, Brussels (BE);
Stefano B. Previdi, Rome (IT);
Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/204,568

(22) Filed: Sep. 4, 2008

(65) Prior Publication Data
US 2008/0320166 A1    Dec. 25, 2008

Related U.S. Application Data

(63) Continuation of application No. 11/025,251, filed on Dec. 29, 2004, now Pat. No. 7,436,838.

(51) Int. Cl.
*H04L 1/00* (2006.01)
*H04L 12/26* (2006.01)

(52) U.S. Cl. .................. 370/395.31; 370/252; 370/254; 370/352; 370/351; 370/238; 370/395.32

(58) Field of Classification Search ................. 370/352, 370/351, 238, 395.32, 395, 32, 252, 254, 370/392, 469, 395.31; 709/224, 238, 242, 709/239; 379/221.02; 714/4
See application file for complete search history.

(56) References Cited

U.S. PATENT DOCUMENTS

| | | | |
|---|---|---|---|
| 5,519,704 A | 5/1996 | Farinacci et al. | |
| 6,202,114 B1 | 3/2001 | Dutt et al. | |
| 6,219,739 B1 | 4/2001 | Dutt et al. | |
| 6,421,731 B1* | 7/2002 | Ciotti et al. | 709/238 |
| 6,728,779 B1 | 4/2004 | Griffin et al. | |
| 6,744,774 B2* | 6/2004 | Sharma | 370/401 |
| 6,757,258 B1 | 6/2004 | Pillay-Esnault | |
| 6,820,134 B1 | 11/2004 | Zinin et al. | |
| 6,857,026 B1* | 2/2005 | Cain | 709/239 |
| 6,968,393 B1 | 11/2005 | Chen et al. | |
| 7,180,864 B2* | 2/2007 | Basu et al. | 370/238 |
| 7,318,108 B2* | 1/2008 | Sreekantiah et al. | 709/242 |
| 7,539,131 B2* | 5/2009 | Shen | 370/217 |
| 7,693,069 B2* | 4/2010 | Hao et al. | 370/237 |
| 7,978,708 B2* | 7/2011 | Filsfils et al. | 370/395.31 |
| 2002/0131362 A1* | 9/2002 | Callon | 370/216 |
| 2003/0174653 A1 | 9/2003 | Basu et al. | |

(Continued)

OTHER PUBLICATIONS

J. Moy, "OSPF Version 2", Request for Comments 2328, Apr. 1998.

(Continued)

*Primary Examiner* — Chuong T Ho
(74) *Attorney, Agent, or Firm* — Cesari and McKenna, LLP

(57) ABSTRACT

In one embodiment, an inter-domain routing protocol stores an inter-domain routing protocol route having an associated next-hop address. A routing table is searched for an for an intra-domain routing protocol route that may be used to reach the next-hop address of the inter-domain routing protocol route. Such route is marked as an important route for convergence. Later, in response to a change in the network requiring a routing table update, the intra-domain routing protocol route marked as an important route for convergence is processed by an intra domain routing protocol before any other intra-domain routing protocol routes are processed that are not marked as important routes for convergence.

25 Claims, 6 Drawing Sheets

U.S. PATENT DOCUMENTS

| | | | |
|---|---|---|---|
| 2004/0044786 A1 | 3/2004 | Basso et al. | |
| 2004/0081154 A1 | 4/2004 | Kouvelas | |
| 2005/0025118 A1* | 2/2005 | Hao et al. | 370/351 |
| 2005/0047353 A1 | 3/2005 | Hares | |
| 2005/0265308 A1* | 12/2005 | Barbir et al. | 370/351 |
| 2006/0002402 A1 | 1/2006 | Nalawade et al. | |
| 2006/0029035 A1 | 2/2006 | Chase et al. | |
| 2011/0007629 A1* | 1/2011 | Atlas et al. | 370/225 |

OTHER PUBLICATIONS

R. Callon, "Use of OSI IS-IS for Routing in TCP/IP and Dual Environments", Request for Comments 1195, Dec. 1990.

Y Rekhter et al., "A Border Gateway Protocol 4 (BGP-4)", Request for Comments 1771, Mar. 1995.

Radia Perlman, "Interconnections Bridges and Routers", Addison-Wesley Publishing Company, Inc. 1992, pp. 323-329.

Y. Rekhter et al., "A Border Gateway Protocol 4 (BGP-4)", Internet Draft: www.ietf.org/internet-drafts/draft-ietf-idr-bgp4-23.txt, Nov. 2003.

Clarence Filsfils et al., U.S. Patent Application "Automatic Route Tagging of BGP Next-Hop routes in IGP", Serial No. not yet assigned, Filed Dec. 29, 2004.

U.S. Appl. No. 11/025,251, filed Dec. 29, 2004 by Clarence Filsfils et al. for an Automatic Prioritization of BGP Next-Hop in IGP Convergence, all pages.

* cited by examiner

AUTOMATIC PRIORITIZATION OF BGP NEXT-HOP IN IGP CONVERGENCE

CROSS-REFERENCE TO RELATED APPLICATIONS

This application is a continuation of U.S. patent application Ser. No. 11/025,251, filed on Dec. 29, 2004, now issued as U.S. Pat. No. 7,436,838 on Oct. 25, 2008, entitled "Automatic Prioritization of BGP Next-Hop In IGP Convergence" by Clarence Filsfils et al.

The present invention is related to the following commonly assigned U.S. patent application Ser. No. 11/025,203 -entitled, Automatic Route Tagging of BGP Next-Hop Routes in IGP, filed Dec. 29, 2004, now published as U.S. publication No. US2006-0140136 on Jun. 29, 2006, and hereby incorporated by reference.

FIELD OF THE INVENTION

This invention relates generally to computer networks, and, more specifically, to a technique for enhancing convergence in a computer network.

BACKGROUND OF THE INVENTION

Data communication in a computer network involves the exchange of data between two or more entities interconnected by communication links and subnetworks (subnets). These entities are typically software programs executing on hardware computer platforms, such as end nodes and intermediate network nodes. The intermediate network nodes interconnect the communication links and subnets to enable transmission of data between the end nodes, such as personal computers or workstations. A local area network (LAN) is an example of a subnet that provides relatively short distance communication among the interconnected nodes, whereas a wide area network (WAN) enables long distance communication over links provided by public or private telecommunications facilities. The Internet is an example of a WAN that connects disparate computer networks throughout the world, providing global communication between nodes on various networks.

Communication software executing on the nodes correlate and manage data communication with other nodes. The nodes typically communicate by exchanging discrete messages or packets of data according to predefined protocols, such as the Trans-mission Control Protocol/Internet Protocol (TCP/IP). In this context, a protocol consists of a set of rules defining how the nodes interact with each other. In addition, network routing software executing on the intermediate nodes allow expansion of communication to other nodes. Collectively, these hardware and software components comprise a collection of computer networks.

Since management of computer networks can prove burdensome, smaller groups of one or more computer networks can be maintained as separate routing domains or autonomous systems (ASes). In this context, a routing domain is broadly construed as a collection of interconnected nodes within a common address space (e.g., a level, area or AS), and an AS is a routing domain managed by a single administrative entity, such as a company, an academic institution or a branch of government. To interconnect dispersed networks and/or provide Internet connectivity, many organizations rely on the infrastructure and facilities of Internet Service Providers (ISPs). An ISP is an example of an AS that typically owns one or more "backbone" networks configured to provide high-speed connection to the Internet. To interconnect private routing domains that are geographically diverse, an organization (customer) may subscribe to one or more ISPs and couple its private domain networks to the ISP's equipment. Here, an intermediate network node, such as a switch or router, may be utilized to interconnect a plurality of private networks to an IP backbone network.

ISP backbone networks generally require fast convergence in order to provide a reliable service to its customers. Convergence, in this context, denotes the ability of a router or network to react to failures or, more generally, to network events and to recover from those failures in order to have minimal disruption time. Examples of such failures include link or node failures. Fast convergence thus involves the ability of the ISP backbone networks to react very quickly to such link and node failures to thereby reroute traffic over alternate paths and, thus, minimize service disruption.

A main component of fast convergence in a router is a routing information base (RIB). The RIB is a process that manages a routing table that holds many (e.g., thousands) of routes computed by different protocols, including both interior gateway protocols (IGP) and exterior gateway protocols (EGP). IGP protocols, such as conventional link-state protocols, are intra-domain routing protocols that define the manner with which routing information and network-topology information are exchanged and processed in a routing domain, such as an ISP backbone network. Examples of conventional link-state protocols include, but are not limited to, the Open Shortest Path First (OSPF) protocol and the Intermediate-System-to-Intermediate-System (ISIS) protocol. The OSPF protocol is described in more detail in Request for Comments (RFC) 2328, entitled *OSPF Version 2*, dated April 1998, which is incorporated herein by reference in its entirety. The ISIS protocol is described in more detail in RFC 1195, entitled *Use of OSI IS-IS for Routing in TCP/IP and Dual Environments*, dated December 1990, which is incorporated herein by reference in its entirety.

Each router running a link-state protocol (i.e., IGP) maintains an identical link-state database (LSDB) describing the topology of the routing domain. Each piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighbors for the purpose of exchanging routing information and abstracting the network topology. One or more router adjacencies may be established over an interface. Each router distributes its local state throughout the domain in accordance with an initial LSDB synchronization process and a conventional flooding algorithm.

In order to guarantee convergence of a link-state protocol, link-state protocol data units (PDUs) that originate after an initial LSDB synchronization between neighbors is completed are delivered to all routers within the flooding scope limits. The PDUs are used to exchange routing information between interconnected routers. The flooding scope limits may comprise an area, a level or the entire AS, depending on the protocol and the type of link-state PDU. An area or level is a collection or group of contiguous networks and nodes (hosts), together with routers having interfaces to any of the included networks. Each area/level runs a separate copy of the link-state routing algorithm and, thus, has its own LSDB. In the case of OSPF, the PDU is a link state advertisement (LSA) comprising a unit of data describing the local state of a router or network, whereas in the case of ISIS, the PDU is a link state packet (LSP). As used herein, a LSA generally describes any message used by an IGP process to communicate routing information among the nodes, such that the collected LSAs of all routers and networks form the LSDB for the particular link-state protocol.

Broadly stated, the IGP process executing in a sending router typically generates and disseminates a LSA whose routing information includes a list of the node's neighbors and one or more "cost" values associated with each neighbor. A cost value associated with a neighbor is an arbitrary metric used to determine the relative ease/burden of communicating with that router. For instance, the cost value may be measured in terms of the number of hops required to reach the neighbor, the average time for a packet to reach the neighbor, and/or the amount of network traffic or available bandwidth over a communication link coupled to the neighbor.

LSAs are typically transmitted ("advertised") among the routers until each router can construct the same "view" of the network topology by aggregating the received lists of neighbors and cost values. The IGP process advertises routes internal to the routing domain ("internal routes") via LSAs that typically comprise the routers' loopback addresses as well as interface/link addresses. A loopback address is a type of "virtual" interface identifier of the router that is stable and always available (does not fail) and, as such, is advertised instead of a physical interface address to ensure that the router can always reach its neighbor. Each router may input this received routing information to a "shortest path first" (SPF) calculation that determines the lowest-cost network paths that couple the router with each of the other network nodes. The well-known Dijkstra algorithm is a conventional technique for performing such a SPF calculation, as described in more detail in Section 12.2.4 of the text book *Interconnections Second Edition*, by Radia Perlman, published September 1999.

The routers typically have a topology table that contains all destinations advertised by neighbors. Each entry in the topology table includes the destination address and a list of neighbors that have advertised the destination. For each neighbor, the entry records the advertised metric, which the neighbor stores in its routing table. The metric that the router uses to reach the destination is also associated with the destination. The metric that the router uses in the routing table, and to advertise to other routers, is the sum of the best-advertised metric from all neighbors and the link cost to the best neighbor. An example of a topology table is the LSDB having a map of every router, its links and the states of those links in the routing domain. The LSDB also has a map of every network and every path to each network in the routing domain.

Specifically, the LSA is processed by the IGP process of a receiving router and provided to the RIB so that it can process the advertisement (along with other routing information) to determine best paths for purposes of populating a forwarding table of a forwarding information base (FIB). In a link state protocol, such as ISIS and OSPF, the router that is directly affected by a failure (i.e., closest to the failure) advertises such failure via the LSA to the rest of the network. In response, each router in the network computes a new network topology and, thus, a new path around the failure. To achieve fast convergence, the IGP process of each router re-computes its topology table and updates the routing table to reflect the topology change. More specifically, the SPF calculation is applied to the contents of the LSDB to compute a shortest path to each destination network. To that end, the algorithm prunes the database of alternate paths and creates a loop-free shortest path tree (SPT) of the topological routing domain. The routing table is then updated to correlate destination nodes with network interfaces associated with the lowest-cost paths to reach those nodes, as determined by the SPF calculation.

A plurality of interconnected ASes may be configured to exchange messages in accordance with an EGP, such as the Border Gateway Protocol version 4 (BGP). To implement the BGP protocol, each routing domain (e.g., AS) includes at least one "border" router through which it communicates with other, interconnected ASes. Before transmitting such messages, however, the routers cooperate to establish a logical "peer" connection (session). BGP is an inter-domain routing protocol that generally operates over a reliable transport protocol, such as TCP, to establish a TCP connection/session; any two border routers that have opened a TCP connection (session) to each other for the purpose of exchanging routing information are known as peers or neighbors. BGP performs routing between ASes by exchanging routing (reachability) information among neighbors of the systems.

The routing information exchanged by BGP neighbors typically includes destination address prefixes, i.e., the portions of destination addresses used by the routing protocol to render routing ("next hop") decisions, and associated path attributes. Examples of such destination addresses include Internet Protocol (IP) version 4 (IPv4) and version 6 (IPv6) addresses, while an example of a path attribute is a next-hop address. Note that the combination of a set of path attributes and a prefix is referred to as a "route"; the terms "route" and "path" may be used interchangeably herein. The BGP routing protocol is well known and described in detail in *Request For Comments* (*RFC*) 1771, by Y. Rekhter and T. Li (1995), Internet Draft <draft-ietf-idr-bgp4-20.txt> titled, *A Border Gateway Protocol* 4 (BGP-4) by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

Two BGP-enabled routers (i.e., BGP speakers) that are not in the same AS use external BGP (eBGP) to exchange routes. Internal BGP (iBGP) is a form of BGP that exchanges routes among iBGP neighbors within an AS. BGP speakers within an AS are typically connected via a fully meshed iBGP session arrangement to ensure that all BGP speakers receive route updates from the other BGP speakers in the AS. When a BGP speaker receives updates from multiple ASes that describe different paths to the same destination, the speaker chooses a single best path for reaching that destination (prefix). Once chosen, the speaker uses BGP to propagate that best path to its neighbors. The decision is based on the value of attributes, such as next-hop, contained in a BGP update message and other BGP-configurable factors. In this context, the BGP next-hop attribute is the network (IP) address of the next hop (neighbor) used to reach the destination prefix.

More specifically, each route advertised by BGP must have a next hop address that is reachable through IGP in order for that route to be considered valid. That is, a valid BGP route must contain an attribute (such as a BGP next-hop address) that, in turn, must exist in the routing table of the router through IGP. Both BGP and IGP (OSPF, ISIS) provide routes (best paths per prefixes) to the RIB; however, among the prefixes provided by IGP that the RIB installs into the routing table are those prefixes that are used as BGP next hop addresses. These BGP next hop addresses are illustratively loopback addresses of the BGP next-hop routers.

As noted, ISP backbone networks require fast convergence in order to provide a reliable service to its customers. Convergence occurs when all of the routers have a consistent perspective ("view") of the network topology. After a topology change, e.g., one or more link and/or node failures, the routers re-compute their best paths; this typically disrupts the service provided by the ISP. The ISP backbone networks must therefore be able to react quickly to such failures in order to re-route traffic over alternate paths and, thus, minimize service disruption. However, not all routes require fast convergence. Typically the routes (addresses) used as BGP next-hop attributes within BGP update messages are considered most important addresses because they enable connectivity inside and outside of the routing domain. For example, these next-hop addresses are typically addresses of subnets used to connect servers/gateways; as such, they are considered most important because BGP relies on them for external activity, i.e., activity external to the routing domain. Yet, the addresses of subnets used to connect servers and gateways could also be part of an internal routing domain. Here, the routers may connect voice over IP (VoIP) servers, such that all IP telephony of the routing domain relies on those servers. Therefore it is desirable to prioritize these next hop addresses to enable fast convergence.

SUMMARY OF THE INVENTION

The present invention overcomes the disadvantages of the prior art by providing a technique for configuring an intermediate network node to automatically determine whether a route advertised by a routing protocol is important for fast convergence in a computer network. As used herein, an important route needed for fast convergence is a route advertised by the routing protocol, such as an exterior gateway routing protocol (EGP), as a next-hop address, since external connectivity relies on such a route. A routing information base (RIB) process executing on the node stores the advertised route and, notably, interacts with an interior gateway routing protocol (IGP) process executing on the node to identify the route as an important route. Identification of an important route, in turn, allows IGP to process the route in a high priority fashion, thereby facilitating fast convergence.

In the illustrative embodiment, the intermediate network node is a router and the advertised route is stored in a routing table maintained by the RIB. In addition, the IGP process may be implemented as an Open Shortest Path First (OSPF) protocol process and/or an Intermediate-System-to-Intermediate-System (ISIS) protocol process. Moreover, the EGP is preferably the Border Gateway Protocol (BGP) and, to that end, the important route is a route that represents a BGP next-hop attribute. As described herein, the RIB detects whether a route is used as a BGP next-hop attribute (address) and, if so, communicates the importance of this route to the IGP process so that it can process the route with high priority.

Specifically, a BGP process executing on the router performs a best path computation that selects a best route per prefix. The BGP process installs that best route, along with a next-hop attribute associated with that route, into the routing table of the RIB. The BGP process then signals (informs) the RIB that the next-hop attribute (address) of the BGP route is an important address. In response, the RIB searches its routing table for a route (i.e., an IGP route) that corresponds to the BGP next-hop address and "flags" (marks) that corresponding IGP route as an important route for convergence. The RIB then communicates (signals) the importance of this route to the IGP (ISIS or OSPF) process. The IGP process maintains a list of routes (prefixes) considered important for fast convergence. At each subsequent routing change requiring re-computation of its topology table and update of the RIB's routing table, IGP processes these important routes before other routes.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
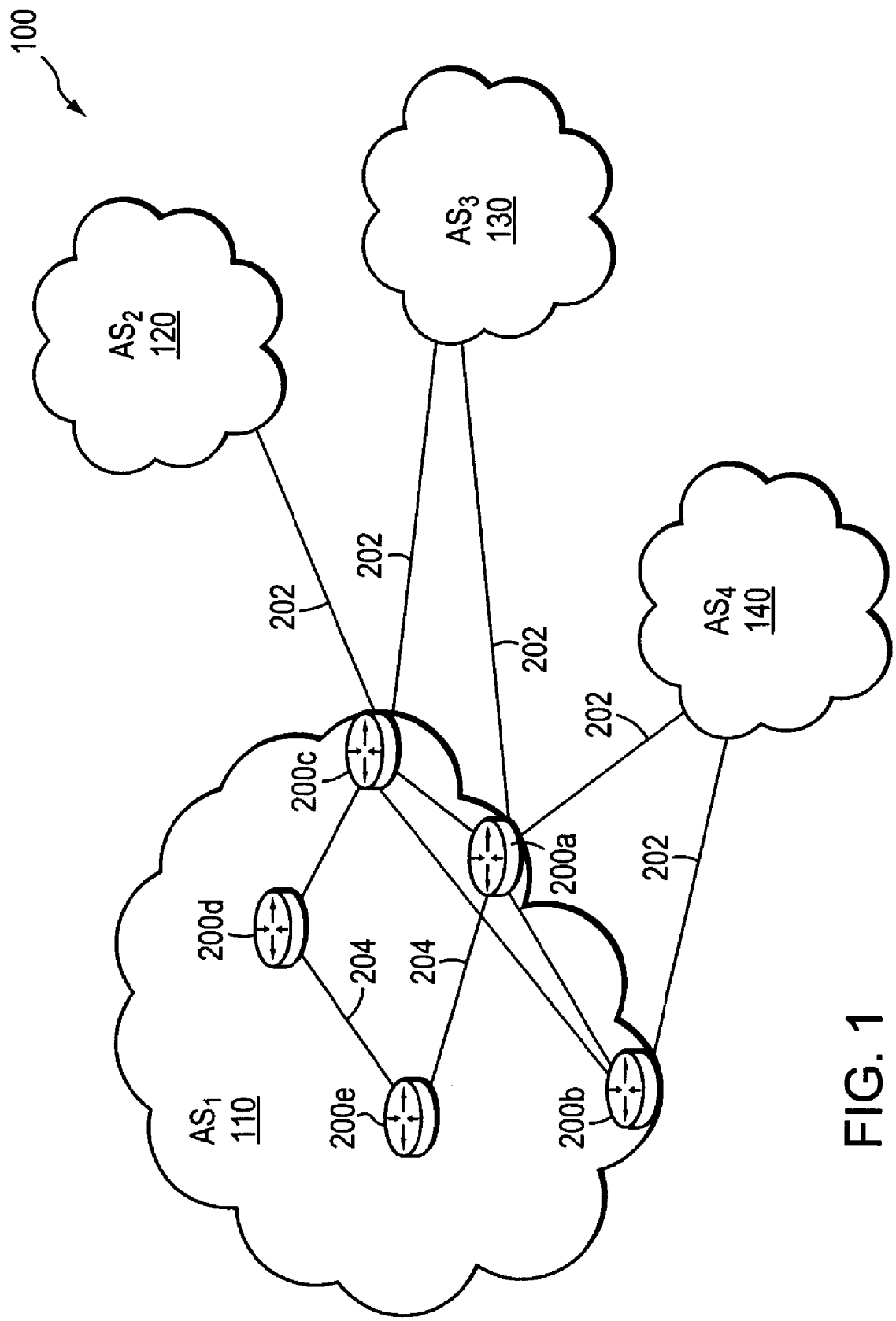
FIG. 1 is a schematic block diagram of a computer network comprising a plurality of routing domains interconnected by intermediate network nodes, such as routers.

FIG. 1 is a schematic block diagram of a computer network 100 comprising a plurality of routing domains interconnected by intermediate network nodes. The intermediate network nodes may comprise switches but, in the illustrative embodiment, are routers 200. The routing domains or autonomous systems ($AS_{1-4}$) are illustratively interconnected by border routers 200a-c via point-to-point communication links 202, such as frame relay links, asynchronous transfer mode links or other serial links. The border routers 200a-c of AS 110 ($A_1$) are illustratively coupled to routers 200d-e via subnetworks, such as local area networks 204. Communication among the routers 200 is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Routing decisions within each AS may rely on a predetermined "interior" gateway routing protocol (IGP). An example of an IGP is a conventional link-state protocol, such as the Open Shortest Path First (OSPF) or Intermediate-System-to-Intermediate-System (ISIS) protocol. In addition, routing information may be exchanged among the ASes 110-140 using an "exterior" gateway protocol (EGP), such as the Border Gateway Protocol version 4 (BGP). To that end, the BGP-enabled routers (BGP speakers) 200a-c exchange routing information with other BGP speakers that are not in the same AS using an external form of BGP (eBGP), while the BGP speakers 200a-c within an AS exchange routing information using an internal form of BGP (iBGP).

Figure 2:
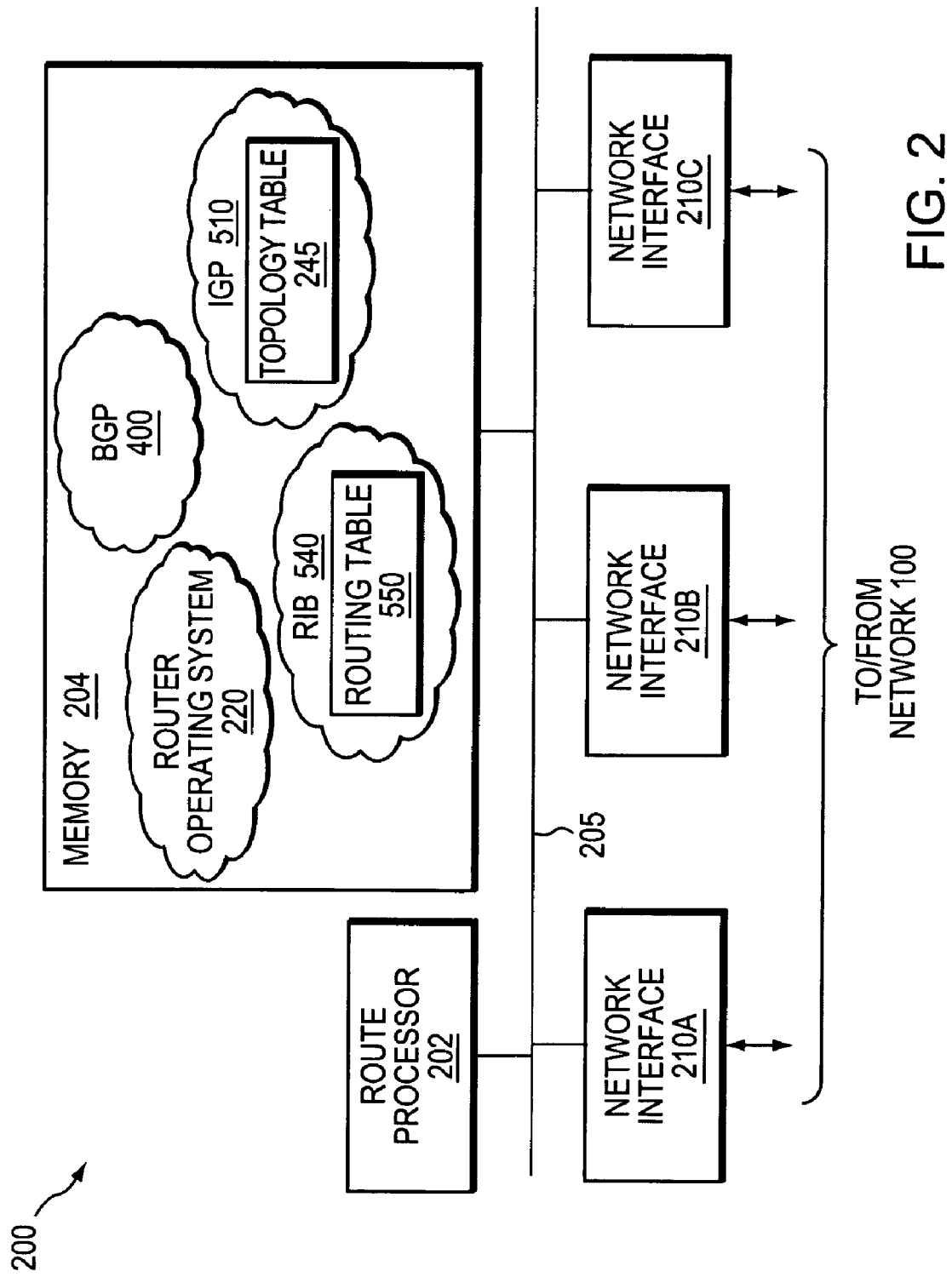
FIG. 2 is a schematic block diagram of an embodiment of a router that may be advantageously used with the present invention.

FIG. 2 is a schematic block diagram of a router 200 that may be advantageously used as a border router in accordance with the present invention. The router 200 comprises a route processor 202 coupled to a memory 204 and a plurality of network interface adapters 210$_{A-C}$ via a bus 205. The memory 204 may comprise storage locations addressable by the processor and interface adapters for storing software programs and data structures, such as a routing table 550 and topology table 245, respectively, that may be advantageously used with the inventive technique described herein. The route processor 202 may comprise processing elements or logic for executing the software programs and manipulating the data structures. It will be apparent to those skilled in the art that other processor and memory means, including various computer readable media, may be used for storing and executing program instructions pertaining to the inventive technique described herein.

A router operating system 220, portions of which are typically resident in memory 204 and executed by the route processor 202, functionally organizes the router by, inter alia, invoking network operations in support of software processes executing on the router. In one embodiment of the invention, the operating system 220 may be implemented as a single process with a large memory address space, wherein pieces of code within that process provide operating system services, such as one or more routing protocols. Yet, in the illustrative embodiment, the operating system services may be implemented as separately-scheduled processes in distinct, protected address spaces. These software processes, each with its own process address space, execute on the router to manage resources internal to the router and, in the case of a routing protocol, to interact with users. As described herein, these software processes include routing information base (RIB 540) and routing protocol modules, such as IGP 510 and BGP 400. Communication among the processes is typically effected by the exchange of messages; a known message-passing mechanism provided by router operating system 220 to transfer information between processes (and process address spaces) is the Inter Process Communication (IPC) mechanism.

Figure 3:
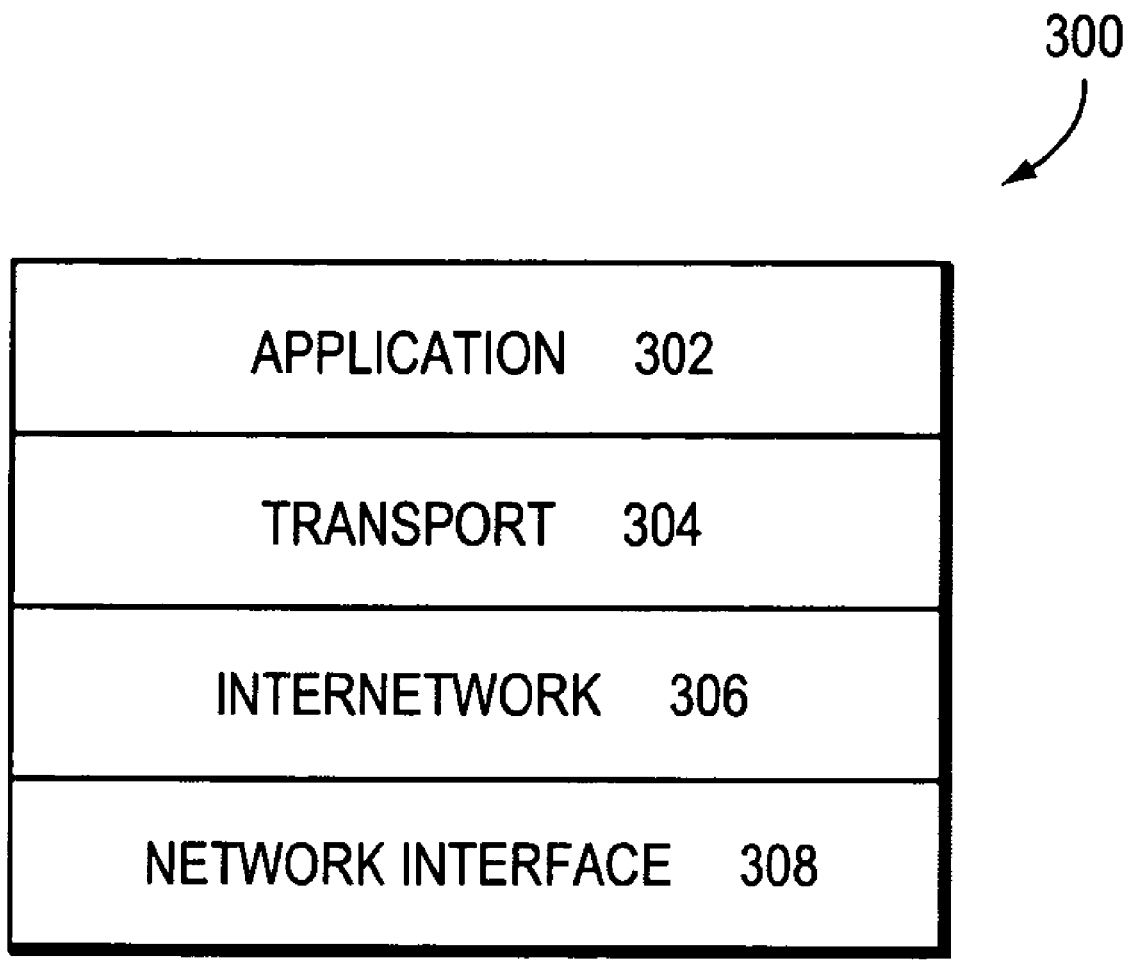
FIG. 3 is a schematic block diagram of a conventional network protocol stack, such as the Internet communications protocol stack, within the router of FIG. 2.

A key function of the router 200 is determining the next node to which a packet is sent; in order to accomplish such "routing" the routers cooperate to determine optimal paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by 4 layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol. IP is primarily a connectionless protocol that provides for internetwork routing, fragmentation and reassembly of exchanged packets—generally referred to as "datagrams" in an Internet environment—and which relies on transport protocols for end-to-end reliability. An example of such a transport protocol is the TCP protocol, which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that routers utilize so that they can cooperate to calculate paths through the computer network 100. IGP 510, such as OSPF and/or ISIS, is an intra-domain routing protocol that may be used to perform routing (for the internetwork layer 306) within each routing domain of the computer network 100. As noted, IGP 510 maintains a topology table 245 that is configured to store a database of the entire set of nodes and links in the network. This database is provided as an input to a shortest path first (SPF) calculation, e.g., the Dijkstra algorithm, which output is used to construct a shortest path tree (SPT). The SPT is the set of shortest paths, e.g., from the router that computes the algorithm, to any other router in the network. The SPT is thus a subset of the entire database of links and nodes that results from essentially pruning the database. The output of SPT computation is then provided to the RIB 540. That is, the IGP process 510 provides to the RIB 540 all address prefixes that have been advertised by other nodes in the network that are part of the SPT. The RIB then computes (installs) those prefixes into its routing table 550.

The Border Gateway Protocol version 4 (BGP) is an inter-domain routing protocol used to perform routing (for the internetwork layer 306) between routing domains (e.g., ASes) of the computer network. BGP speakers within the ASes (hereinafter "neighbors") exchange routing and reachability information among the ASes over a reliable transport layer connection, such as TCP. An adjacency is a relationship formed between selected neighbors for the purpose of exchanging routing messages and abstracting the network topology. The BGP protocol uses the TCP transport layer 304 to ensure reliable communication of routing messages among the neighbors.

In order to perform routing operations in accordance with the BGP protocol, each BGP speaker 200a-c maintains a routing table that lists all feasible paths to a particular network. The routers further exchange routing information using BGP routing update messages when their routing tables change. The routing update messages are generated by an updating router to advertise routes to each of its neighbors throughout the computer network. These routing updates allow the BGP routers of the ASes to construct a consistent and up-to-date view of the network topology.

Figure 4:
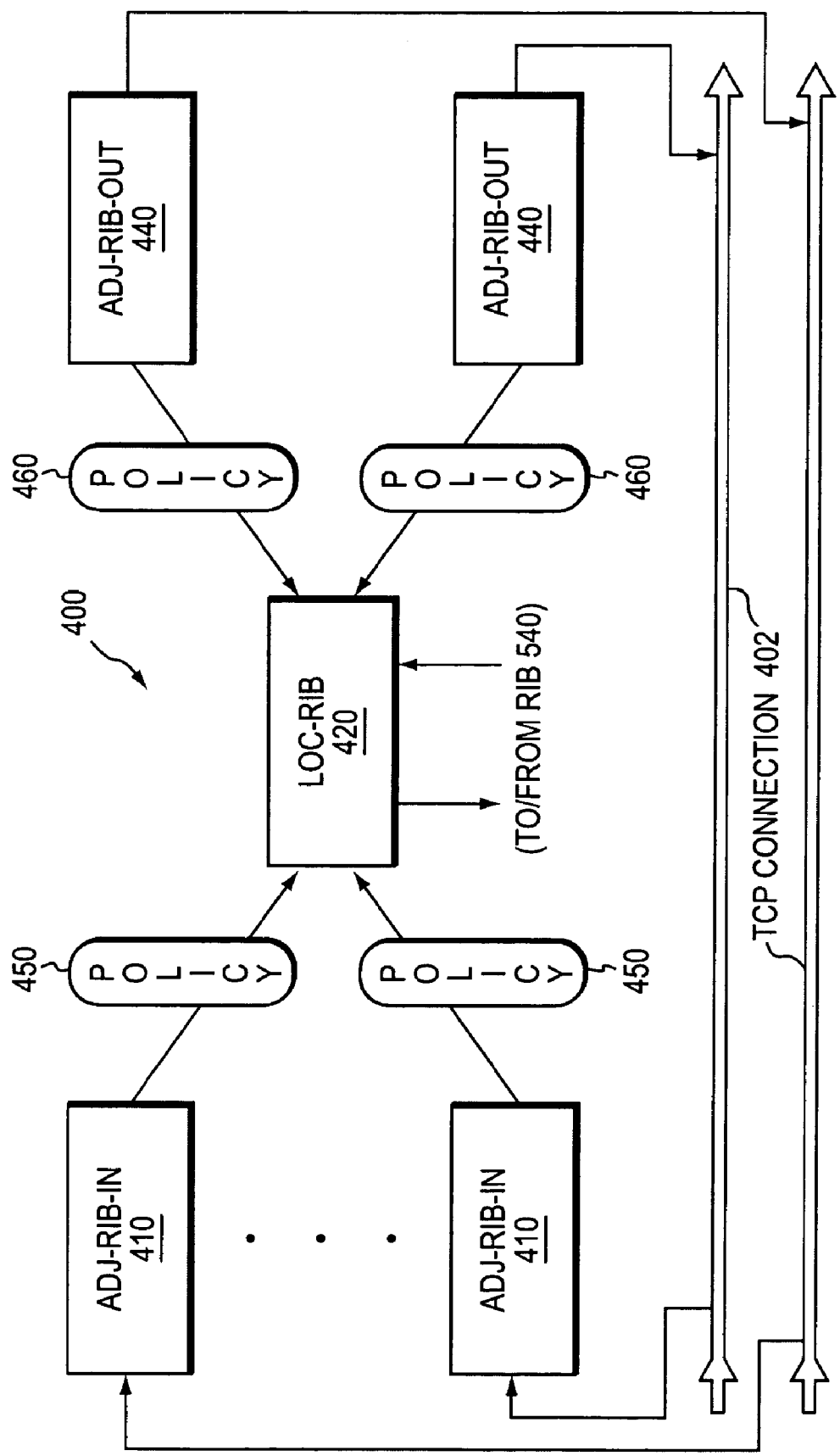
FIG. 4 is a schematic block diagram illustrating the architecture of the Border Gateway Protocol (BGP)

FIG. 4 is a schematic block diagram illustrating the architecture of the BGP protocol 400. BGP neighbors announce routing updates via TCP connections 402. The BGP protocol "listens" for routing update messages and stores all learned routes for each connection in a BGP database. The BGP database is illustratively organized as Adjacency RIB In (Adj-RIB-In 410), Adjacency RIB Out (Adj-RIB-Out 440) and local RIB (loc-RIB 420). Each neighbor/TCP connection 402 is associated with an Adj-RIB-In 410 and an Adj-RIB-Out 440. Note that this association is a conceptual data construct; there is typically not a separate Adj-RIB-In/-Out database for each neighbor.

The BGP protocol 400 runs inbound policy on all routes "learned" for each connection 402 and those routes that match are stored in an Adj-RIB-In 410 unique to that connection. Additional inbound policy 450 (filtering) is then applied to those stored routes, with a potentially modified route being installed in the Loc-RIB 420. The Loc-RIB 420 is generally responsible for performing a BGP best path computation that selects the best route per prefix from the union of all policy-modified Adj-RIB-In routes, resulting in routes referred to as "best paths". The set of best paths is then installed in the routing table 550 of RIB 540, where they may contend with routes from other protocols (such as IGP 510) to become the "optimal" path ultimately selected for forwarding. Thereafter, the set of best paths have outbound policy 460 run on them, the result of which is placed in appropriate Adj-RIB- Out 440 and announced to the respective neighbors via the same TCP connections 402 from which routing update messages were learned.

In addition to providing a best path per prefix, the Loc-RIB 420 also provides the RIB 540 with a next hop attribute associated with that best path. That is, the route (best path per prefix) that BGP provides to the RIB includes an indication of the next hop address to that prefix. Notably, the next hop attribute (address) sent to the RIB 540 must be resident in the routing table 550 through another protocol (e.g., IGP 510). The BGP process 400 ensures that the next hop attribute is reachable within IGP prior to sending the best path to the RIB by performing certain validations or checks to the route, one of which is to verify that the next hop attribute is known by the RIB as a valid route. To that end, BGP 400 performs a look up operation into the RIB 540 (e.g., via the IPC mechanism) to verify that the next hop of the best path is already known (resident) in the routing table 550.

The present invention is directed to a technique for configuring an intermediate network node, such as a router, to automatically determine whether a route advertised by a routing protocol is important for fast convergence in a computer network. As used herein, an important route needed for fast convergence is a route advertised by the routing protocol, such as BGP 400, as a next-hop address, since external connectivity relies on such a route. The RIB 540 stores the advertised route in its routing table 550 and, notably, interacts with IGP 510 to identify the route as an important route, i.e., a route that represents a BGP next-hop attribute.

Figure 5:
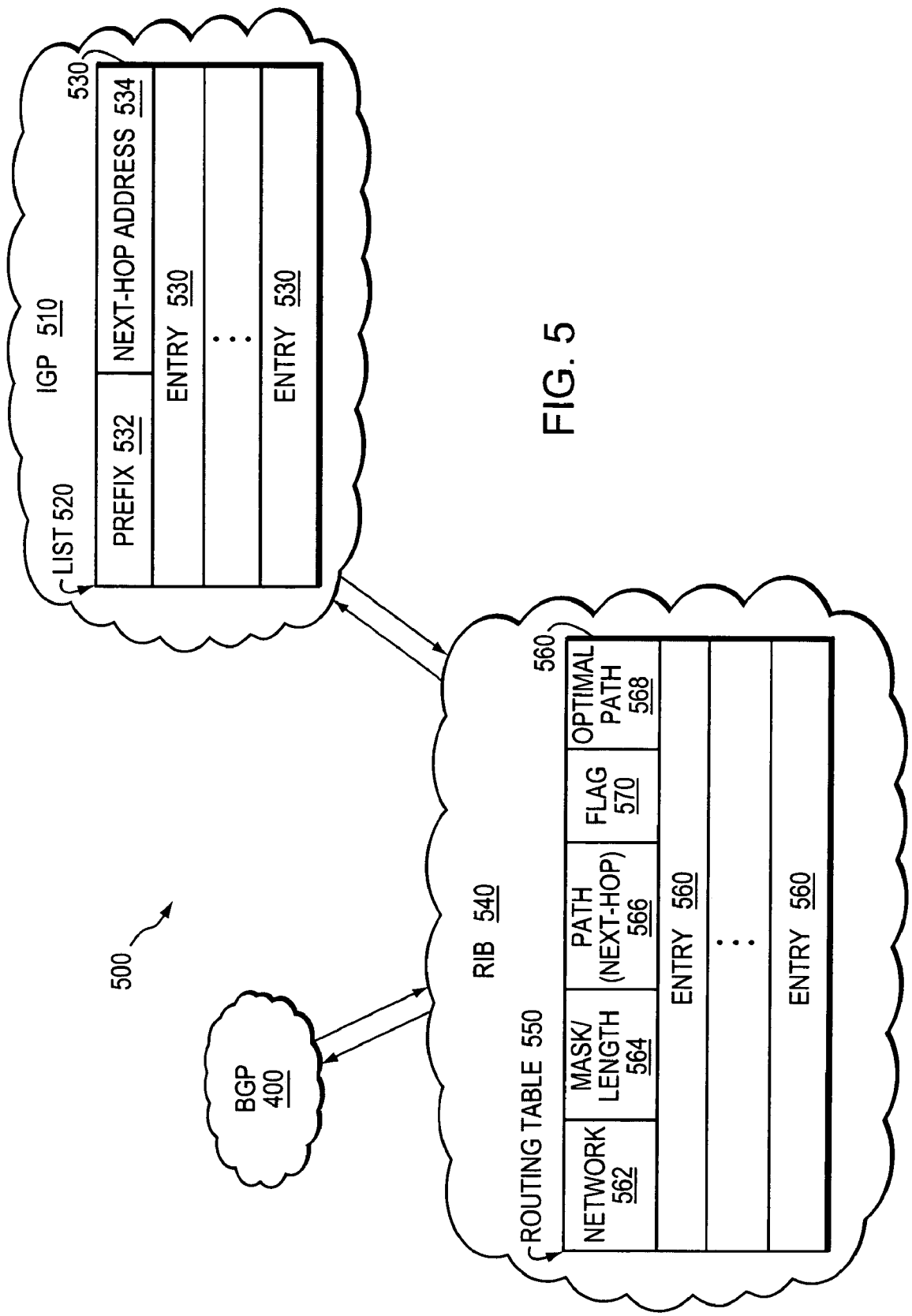
FIG. 5 is a schematic block diagram illustrating the interaction between a Routing Information Base (RIB) and Interior Gateway Protocol (IGP) of the router to identify an important route in accordance with the present invention.

FIG. 5 is a schematic block diagram illustrating the interaction between the RIB and IGP to identify an important route in accordance with the present invention. The BGP process 400 installs a route (i.e., best path per prefix), along with a next-hop attribute associated with that route, into the routing table 550 of the RIB 540. The routing table 550 comprises a plurality of entries 560, each of which includes a plurality of fields. Specifically, each entry 560 includes a network field 562 containing a network portion of an IP address (i.e., a "network address") that identifies a network and a mask/length field 564 containing a mask for differentiating between the network address and a host portion of the IP address. As used herein, an "address prefix" is defined as the result of applying the mask to the network address. A path field 566 contains one or more paths, wherein each path describes path attributes of routes in the computer network including, notably, a "next hop address" attribute of the neighbor used to reach the prefix. As noted, the combination of one or more path attributes and a prefix is referred to as a "route". An optimal path field 568 contains the optimal best path from among the paths described in field 566 based on pre-specified route selection criteria.

Once the route is installed in the table 550, the RIB 540 knows that (i) the route is a BGP route, (ii) there is a BGP next hop and (iii) the next hop is reachable (exists) in the routing table, because BGP has ensured that IGP 510 installed that next hop as an IGP route. The BGP process 400 then signals (informs) the RIB via, e.g., an IPC message or function call, that the next-hop attribute (address) of the BGP route is an important address. In response, the RIB searches its routing table for a route (i.e., an IGP route) that corresponds to the BGP next-hop address. Essentially, the RIB 540 searches for a route that would allow the router to forward packets towards the next-hop address, i.e., an IGP route that includes the BGP next-hop address within its reachability (address prefix) information. Upon locating such a route, the RIB "flags" (marks) that corresponding IGP route as an important route for convergence. Illustratively, the RIB marks the route as important by manipulating information (e.g., asserting a flag 570) associated with the next hop attribute of the route stored in path field 566 of routing table entry 560. Assertion of flag 570 thus signifies the importance of that route.

Upon detecting that the route is used as a BGP next-hop attribute (address), the RIB 540 communicates (signals) the importance of this route to the IGP process 510 so that it can process the route in a high priority fashion, thereby facilitating fast convergence. Here, the interaction between the RIB 540 and IGP 510 enables identification of the important routes. In the illustrative embodiment, the RIB 540 creates and sends a message to IGP 510 using, e.g., the IPC mechanism, to inform IGP as to the identity of the route and, notably, as to its importance. However, in an alternate embodiment wherein the operating system 220 provides services within a large single process, the RIB may signal the importance of the route to IGP through one or more function calls.

According to another aspect of the invention, the IGP process 510 maintains a list of routes (prefixes) considered important for fast convergence. That is, in response to notification from the RIB that one or more routes are important for convergence, IGP creates a list 520 that contains routes that are important for convergence. The list 520 is illustratively embodied as a data structure containing one or more entries 530, each of which is configured to store a prefix 532 and a next hop address attribute 534 denoting an important route. At each subsequent routing change requiring re-computation of its topology table and update of the RIB's routing table, IGP processes these important routes before other routes.

Specifically, during fast convergence, the IGP process 510 operates on the content of its topology table 245 to compute a SPT and updates the RIB 540 in order to reflect the changes in the topology. Updating of the RIB 540 generally implies (i) removing prefixes, (ii) adding prefixes, and/or (iiii) modifying prefixes in the routing table 550. Thus, the prefixes that comprise the computed SPT are either (i) removed (deleted), (ii) added (installed) or (iii) modified (updated) in the routing table. Since it has been notified of the importance of certain routes/prefixes, IGP 510 processes (e.g., updates the RIB with) those important prefixes first to facilitate fast convergence.

Processing of important prefixes first facilitates fast convergence because the RIB process is a large (and time consuming) component of fast convergence. Computing an SPT takes only a few milliseconds, whereas computing or updating the routing table maintained by the RIB may take several hundreds of milliseconds. In this context, processing of important routes (prefixes) first facilitates convergence. Also, an IGP typically sends update information to the RIB sequentially and, as it receives and processes those updates, the RIB may constantly (sequentially) populate the FIB. In this manner, a forwarding engine operates on the FIB to render forwarding decisions using the results of those important processed routes.

Figure 6:
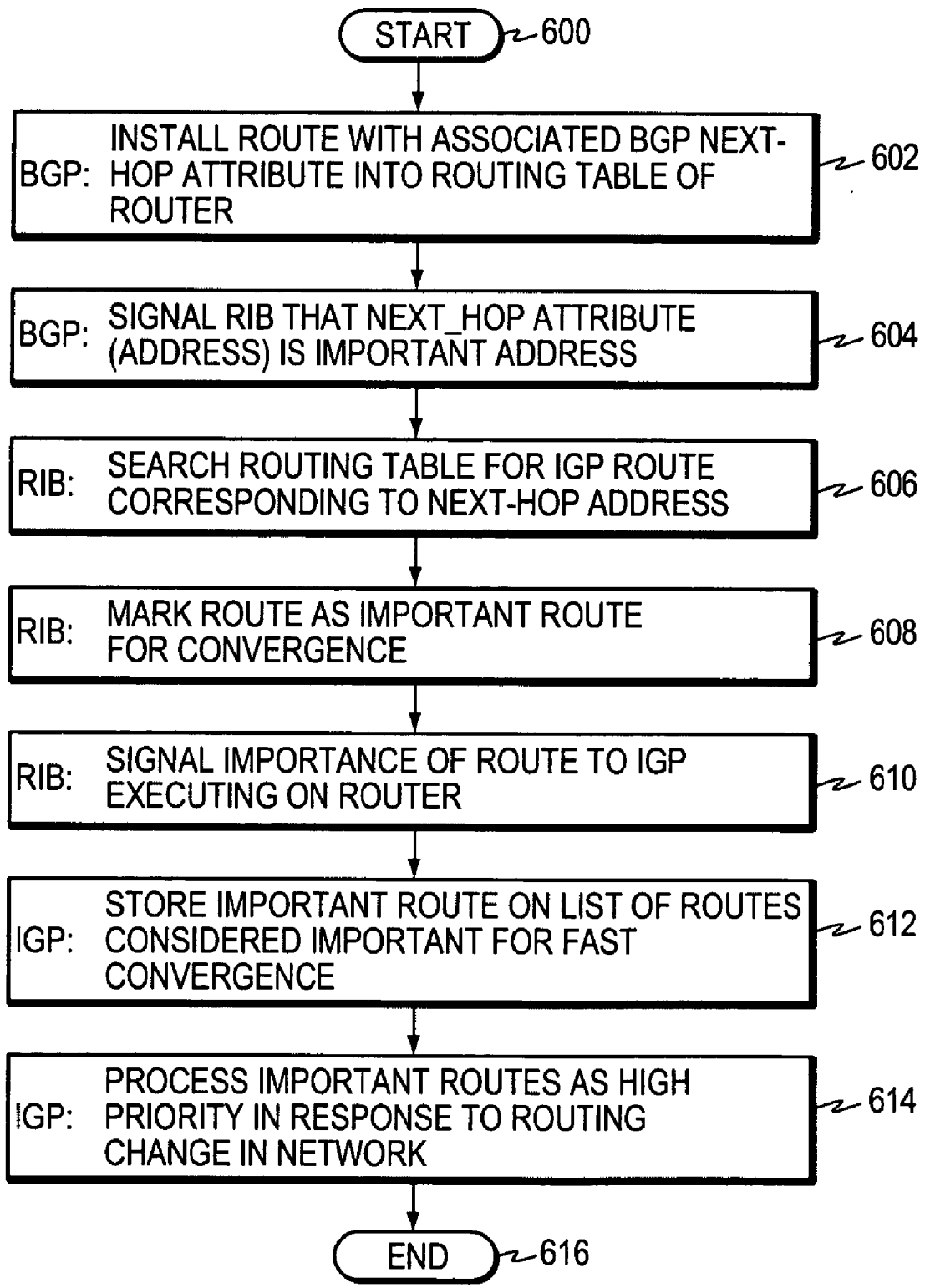
FIG. 6 is a flowchart illustrating a procedure for configuring the router to automatically determine whether a route advertised by a routing protocol, such as BGP, is important for fast convergence in the computer network.

FIG. 6 is a flowchart illustrating a procedure for configuring an intermediate network node, such as a router, to automatically determine whether a route advertised by a routing protocol, e.g., an inter-domain routing protocol, is important for fast convergence in a computer network. The procedure starts at Step 600 and proceeds to Step 602 where the inter-domain routing protocol, such as BGP 400, installs a route with an associated inter-domain (e.g., BGP) next-hop attribute into the routing table 550 of RIB 540. In Step 604, the BGP process signals the RIB that the next-hop attribute (address) of the BGP route is an important address. In Step 606, the RIB searches its routing table for a route (i.e., an IGP route) that corresponds to the BGP next-hop address. In Step

608, the RIB 540 "flags" (marks) the IGP route as an important route for convergence and signals the importance of the route to an intra-domain routing protocol, such as IGP 510, in Step 610. In Step 612, the IGP process 510 stores the important route on a list of routes (prefixes) considered important for fast convergence. In response to a routing change in the network that requires re-computation of topology table 245 and update of routing table 550, IGP 510 processes these important routes as high priority, e.g., first, before other routes, in Step 614. The procedure then ends at Step 616.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method comprising:
   storing, by an inter-domain routing protocol, an inter-domain routing protocol route having an associated next-hop address;
   searching a routing table for an intra-domain routing protocol route used to reach the next-hop address of the inter-domain routing protocol route, wherein whether or not a route is used to reach the next-hop address of an inter-domain routing protocol route indicates whether or not the route should be marked as an important route for convergence;
   in response to locating an intra-domain routing protocol route being used to reach the next-hop address of the inter-domain routing protocol route, marking the intra-domain routing protocol route as an important route for convergence; and
   in response to a change in a network requiring a routing table update, processing the intra-domain routing protocol route marked as an important route for convergence, by an intra domain routing protocol, before processing any other intra-domain routing protocol routes that are not marked as important routes for convergence.

2. The method of claim 1 wherein the inter-domain routing protocol is a Border Gateway Protocol (BGP) and wherein the inter-domain routing protocol route is a BGP route.

3. The method of claim 1 wherein the intra-domain routing protocol is an interior gateway protocol (IGP) and wherein the intra-domain routing protocol route is an IGP route.

4. The method of claim 3 wherein the IGP is one of Open Shortest Path First (OSPF) and Intermediate-System-to-Intermediate-System (ISIS) protocol.

5. The method of claim 1 further comprising:
   storing the intra-domain routing protocol route marked as an important route for convergence in a list of routes maintained by the intra-domain routing protocol.

6. The method of claim 1 further comprising
   managing the routing table with a routing information base (RIB); and
   wherein the step of searching is implemented by the RIB.

7. The method of claim 1 wherein the steps of storing, searching, and processing are implemented internal to a router.

8. The method of claim 1 wherein the marking comprises asserting a flag associated with a routing table entry corresponding to the route.

9. An apparatus comprising:
   a route processor;
   an inter-domain routing protocol that when executed by the route processor stores an inter-domain routing protocol route that has an associated next-hop address in a routing table within the apparatus;
   a routing information base (RIB) that when executed by the route processor manages the routing table, the RIB configured to search the routing table for an intra-domain routing protocol route used to reach the next-hop address of the inter-domain routing protocol route, wherein whether or not a route is used to reach the next-hop address of an inter-domain routing protocol route indicates whether or not the route should be marked as an important route for convergence, and in response to locating an intra-domain routing protocol locating such route being used to reach the next-hop address of the inter-domain routing protocol route, mark the located intra-domain routing protocol route as an important route for convergence; and
   an intra-domain routing protocol that when executed by the route processor interacts with the RIB, the intra-domain routing protocol configured to, in response to a change in a network requiring a routing table update, process the intra-domain routing protocol route marked as an important route for convergence before any other intra-domain routing protocol routes that are not marked as important routes for convergence.

10. The apparatus of claim 9 wherein the inter-domain routing protocol is a Border Gateway Protocol (BGP) and wherein the inter-domain routing protocol route is a BGP route.

11. The apparatus of claim 10 wherein the intra-domain routing protocol is an interior gateway protocol (IGP) and wherein the intra-domain routing protocol route is an IGP route.

12. The apparatus of claim 11 wherein the IGP is one of Open Shortest Path First (OSPF) and Intermediate-System-to-Intermediate-System (ISIS) protocol.

13. The apparatus of claim 11 wherein the intra-domain routing protocol is further configured to store the intra-domain routing protocol route marked as an important route for convergence in a list of routes maintained by the intra-domain routing protocol.

14. The apparatus of claim 11 wherein the apparatus is a router.

15. The apparatus of claim 11 wherein the RIB is configured to mark the route as an important route for convergence with a flag in a routing table entry corresponding to the route.

16. An apparatus comprising:
   means for storing an inter-domain routing protocol route having an associated next-hop address within the apparatus;
   means for searching a routing table for an intra-domain routing protocol route used to reach the next-hop address of the inter-domain routing protocol route, wherein whether or not a route is used to reach the next-hop address of an inter-domain routing protocol route indicates whether or not the route should be marked as an important route for convergence;

means for, in response to locating an intra-domain routing protocol route being used to reach the next-hop address of the inter-domain routing protocol route, marking the located intra-domain routing protocol route as an important route for convergence; and means for processing, in response to a change in a network requiring a routing table update, the intra-domain routing protocol route marked as an important route for convergence before processing any other intra-domain routing protocol routes that are not marked as important routes for convergence.

17. The apparatus of claim 16 wherein the inter-domain routing protocol is a Border Gateway Protocol (BGP) and wherein the inter-domain routing protocol route is a BGP route.

18. The apparatus of claim 16 wherein the intra-domain routing protocol is an interior gateway protocol (IGP) and wherein the intra-domain routing protocol route is an IGP route.

19. The apparatus of claim 18 wherein the IGP is one of Open Shortest Path First (OSPF) and Intermediate-System-to-Intermediate-System (ISIS) protocol.

20. The apparatus of claim 16 wherein the apparatus is a router.

21. A method comprising:

storing, by an inter-domain routing protocol, an inter-domain routing protocol route having an associated next-hop address;

searching a routing table for an intra-domain routing protocol route used to reach the next-hop address of the inter-domain routing protocol route, and considering such route as an important route for convergence;

storing the intra-domain routing protocol route considered as an important route for convergence in a list of routes maintained by the intra-domain routing protocol; and in response to a change in a network requiring a routing table update, processing the intra-domain routing protocol route considered as an important route for convergence, by an intra domain routing protocol, before processing any other intra-domain routing protocol routes that are not considered as important routes for convergence.

22. The method of claim 21 wherein the inter-domain routing protocol is a Border Gateway Protocol (BGP) and wherein the inter-domain routing protocol route is a BGP route.

23. The method of claim 21 wherein the intra-domain routing protocol is an interior gateway protocol (IGP) and wherein the intra-domain routing protocol route is an IGP route.

24. The method of claim 21 wherein the considering as an important route for convergence comprises marking a routing table entry corresponding to the route with a flag.

25. The method of claim 21 wherein the steps of storing, searching, and processing are implemented internal to a router.

* * * * *